(12) United States Patent
Banuelos et al.

(10) Patent No.: US 10,579,509 B2
(45) Date of Patent: Mar. 3, 2020

(54) MACHINE LEARNING COMPARISON TOOLS

(71) Applicant: MICROSOFT TECHNOLOGY LICENSING, LLC., Redmond, WA (US)

(72) Inventors: Jorge Banuelos, Kirkland, WA (US); Xi Cheng, Kirkland, WA (US); Neelakantan Sundaresan, Bellevue, WA (US); Cenzhuo Yao, Bellevue, WA (US); Kexin Xu, Bellevue, WA (US)

(73) Assignee: MICROSOFT TECHNOLOGY LICENSING, LLC., Redmond, CA (US)

( * ) Notice: Subject to any disclaimer, the term of this patent is extended or adjusted under 35 U.S.C. 154(b) by 0 days.

(21) Appl. No.: 15/990,032

(22) Filed: May 25, 2018

(65) Prior Publication Data
US 2019/0227912 A1 Jul. 25, 2019

Related U.S. Application Data

(60) Provisional application No. 62/619,808, filed on Jan. 21, 2018.

(51) Int. Cl.
*G06F 11/36* (2006.01)
*G06N 20/00* (2019.01)

(52) U.S. Cl.
CPC ........ *G06F 11/3668* (2013.01); *G06F 11/368* (2013.01); *G06F 11/3664* (2013.01); *G06N 20/00* (2019.01)

(58) Field of Classification Search
CPC ............. G06F 11/3664; G06F 11/3668; G06F 11/368; G06N 20/00
See application file for complete search history.

(56) References Cited

U.S. PATENT DOCUMENTS 8,776,028 B1 * 7/2014 Enakiev ............. G06F 11/3664
714/38.11
8,892,954 B1 * 11/2014 Gray ........................ G06F 8/65
714/15

(Continued)

OTHER PUBLICATIONS

Sekhon, Jasjeet S., "Multivariate and Propensity Score Matching Software with Automated Balance Optimization: The Matching Package for R", In Journal of Statistical Software, vol. 42, Issue 7, May 2011, pp. 1-52.

(Continued)

*Primary Examiner* — Ziaul A Chowdhury

(57) ABSTRACT

Machine learning techniques are used to determine the viability of user data measuring the behavior of a new version of the program when compared with user data that measured the behavior of a previous version of the program. The machine learning techniques utilize statistical techniques in a non-conventional manner to train a system to learn from data obtained from the usage of both a new version of the program and a previous version that accounts for the variability in the user population, time variability of the results of the previous version, and feature coverage between the two test results in order to ensure the suitability of the user data in making estimations or predictions about the performance and reliability of the new version.

20 Claims, 10 Drawing Sheets

(56) References Cited

U.S. PATENT DOCUMENTS

| | | | |
|---|---|---|---|
| 8,990,778 B1 | 3/2015 | Allocca et al. | |
| 9,208,062 B1* | 12/2015 | Arguelles | G06F 11/3676 |
| 9,268,663 B1 | 2/2016 | Siddiqui et al. | |
| 9,898,391 B1* | 2/2018 | Morice | G06F 11/3668 |
| 9,983,982 B1* | 5/2018 | Kumar | G06F 11/368 |
| 10,086,782 B1* | 10/2018 | Konrardy | B60L 58/12 |
| 10,146,676 B1* | 12/2018 | Khanduri | G06F 11/3692 |
| 2003/0159089 A1* | 8/2003 | DiJoseph | G06F 11/3664 |
| | | | 714/38.1 |
| 2011/0107153 A1* | 5/2011 | Shufer | G06F 11/3668 |
| | | | 714/45 |
| 2011/0289481 A1* | 11/2011 | Franklin | G06F 11/3668 |
| | | | 717/125 |
| 2012/0143795 A1* | 6/2012 | Han | G06F 11/079 |
| | | | 706/12 |
| 2013/0097706 A1* | 4/2013 | Titonis | G06F 21/56 |
| | | | 726/24 |
| 2014/0075336 A1 | 3/2014 | Curtis et al. | |
| 2014/0189648 A1* | 7/2014 | Everitt | G06F 11/3664 |
| | | | 717/125 |
| 2015/0007140 A1* | 1/2015 | Boshernitsan | G06F 11/3688 |
| | | | 717/124 |
| 2015/0012852 A1* | 1/2015 | Borodin | G06F 11/3664 |
| | | | 715/762 |
| 2015/0339207 A1 | 11/2015 | Hod | |
| 2017/0039128 A1* | 2/2017 | Freschl | G06F 11/3668 |
| 2017/0235848 A1* | 8/2017 | Van Dusen | H04L 41/04 |
| | | | 705/12 |
| 2017/0249234 A1* | 8/2017 | Kalech | G06F 11/0793 |
| 2017/0339553 A1* | 11/2017 | Raleigh | H04L 12/1403 |
| 2019/0035017 A1* | 1/2019 | Haimes | G06N 20/00 |
| 2019/0065342 A1* | 2/2019 | Dickgiesser | G06F 11/368 |

OTHER PUBLICATIONS

Rosenbaum, et al., "Constructing a Control Group Using Multivariate Matched Sampling Methods That Incorporate the Propensity Score", In Journal of The American Statistician, vol. 39, No. 1, Feb. 1985, pp. 33-38.

Gelman, Andrew, "Prior distributions for variance parameters in hierarchical models", In Journal of Bayesian Analysis, vol. 1, No. 3, Sep. 2006, pp. 515-533.

"International Search Report & Written Opinion Issued in PCT Application No. PCT/US19/013416", dated Apr. 8, 2019, 13 Pages.

* cited by examiner

800

| FEATURE 802 | # USERS BETA 804 | # USERS PREVIOUS 806 | % USERS BETA 808 | % USERS PREVIOUS 810 | AVG USAGE FEATURE BETA 812 | AVG USAGE FEATURE PREVIOUS 814 | SEVERITY 816 |
|---|---|---|---|---|---|---|---|
| FEATURE 1 | 39 | 265,605 | 0.22% | 7.64% | 47 | 43 | 97.23% |
| FEATURE 2 | 10 | 47 | 0.06% | 0.00% | 25 | 438 | 99.59% |

| FEATURE 820 | ONLY HAS ENOUGH USERS 822 | ONLY HAS ENOUGH FEATURE USAGE 824 | HAS ENOUGH USERS AND FEATURE USAGE 826 | NOT ENOUGH USERS NOR FEATURE USAGE 828 |
|---|---|---|---|---|
| FEATURE 1 | | YES | | |
| FEATURE 2 | YES | | | |

*FIG. 8B*

| DIMENSION VALUE 1002 | CONCLUSION 1004 | CONFIDENCE 1006 | TOTAL MATCHING USERS 1008 | % FASTER(#) 1010 | % SLOWER(#) 1012 |
|---|---|---|---|---|---|
| PROGRAM A COMMUNITY VERSION | SLOWER | HIGH | 15,533 | 5.03% (782) | 9.67% (1502) |
| PROGRAM A PRO VERSION | FASTER | HIGH | 2,354 | 29.14% (686) | 6.03% (142) |

*FIG. 10*

MACHINE LEARNING COMPARISON TOOLS

CROSS-REFERENCE TO RELATED APPLICATION

This application claims the benefit of U.S. Provisional Application No. 62/619,808, filed on Jan. 21, 2018.

BACKGROUND

Prior to the release of a new version of a software program, the program goes through a rigorous testing program in order to identify defects in the program. Beta testing is often used to test a pre-release or beta version of a software program before the release of the final version of this software program. The beta tests are executed by a group of external users in order to detect issues with the software program prior to its release. The results from the beta tests is used by developers to fix software bugs and to tailor the final version to an acceptable level of performance and reliability.

The beta tests measure various metrics which may be compared with a previous version of the software program. However, a comparison of the metrics from the beta tests with a previous version can be affected by the manner in which the users utilize a particular version of the program thereby making it difficult to make a fair comparison between the performance and reliability of the two versions of the software program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Machine learning techniques are used to determine the viability of the user data that measured the behavior of an established program and a new version of the program in order to compare the two measurements and derive predictions as to the performance and reliability of the new version. The machine learning comparison tool includes a user matching engine, a time-variability-adjusted cohort analysis engine ("TVA cohort analysis engine") and a feature coverage engine.

The user matching engine adjusts for the differences in the testing environment of the users that performed the beta tests with the testing environment of the users that tested the release version by comparing matched samples. A user having tested the release version is matched with a user having tested the beta version based on a closest match of similar features in their respective testing environment. Samples for each metric from these matched users are averaged and then compared to determine how different the two averages are and the significance of the difference. This difference is then used to predict the reliability of the metrics of the beta version.

The TVA cohort analysis engine uses machine learning techniques to perform a time-variability cohort analysis that compares the behavior and metrics of the users having tested the release version during different time periods. The metrics of the users having tested the release version may have changed over time due to changes in the user's testing environment and other factors that may not be known. The TVA cohort analysis engine considers the variability in the metrics over time from the users testing the release version when comparing these metrics with the metrics from the beta tests. This analysis identifies the highest and lowest performing users in order to find out what factors are driving their performance.

The feature coverage engine uses machine learning techniques to ensure that features in a beta version have been utilized sufficiently in the beta tests before any comparison can be made. Features of a program may be underutilized in the beta tests compared with the amount of usage that the feature obtains in a currently released version thereby failing to provide adequate results to make valid conclusions with the collected data.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 8A-8B illustrates exemplary displays showing the results from the feature coverage engine.

FIG. 10 illustrates an exemplary display showing results from the TVA cohort analysis engine.

DETAILED DESCRIPTION

Overview

The subject matter disclosed utilizes machine learning techniques to determine the viability of the user data that measured the behavior of a program for use in predicting the performance and/or reliability of a new version of a program. In one aspect, the subject matter disclosed herein may be applied to predicting the performance and reliability of a beta version of a program. Beta testing is a valuable resource to developers of a software program since it provides insight into use cases and test environments that the developer cannot test themselves. The beta test is used to determine how a beta version of the software program may perform under a particular workload. A beta test may be used to measure certain behaviors of the program in order to catch software bugs and errors and to determine the quality of the beta version prior to its release.

The performance and reliability of a program may be measured using metrics. A metric represents a value that quantifies a measurement associated with a behavior of the program. The metrics include reliability measurements and performance measurements. The reliability of the program may include a crash rate and a hang rate. The performance of the program may include a measurement of how long the program takes to startup, how long a feature of the program takes to perform a task, and so forth.

A simple comparison of the metrics from the beta tests with metrics from tests on a released version may not provide the fair comparison needed to accurately predict or estimate the reliability and performance of the beta version. The results from the beta tests may not always be accurate or useful due to inconsistent user participation, limited usage of the features tested, a smaller size of the user population being tested, different sizes of the input, and so forth. The subject matter disclosed herein significantly improves the comparison of the metrics of the beta tests with the metrics from a released version by using machine learning techniques that can account for differences in the user testing environment, the time variability effect on the results of these tests, and sufficiency in the feature coverage used in the tests.

Attention now turns to a further discussion of the system, devices, components, and methods utilized in the machine learning comparison tool.

System

Figure 1:
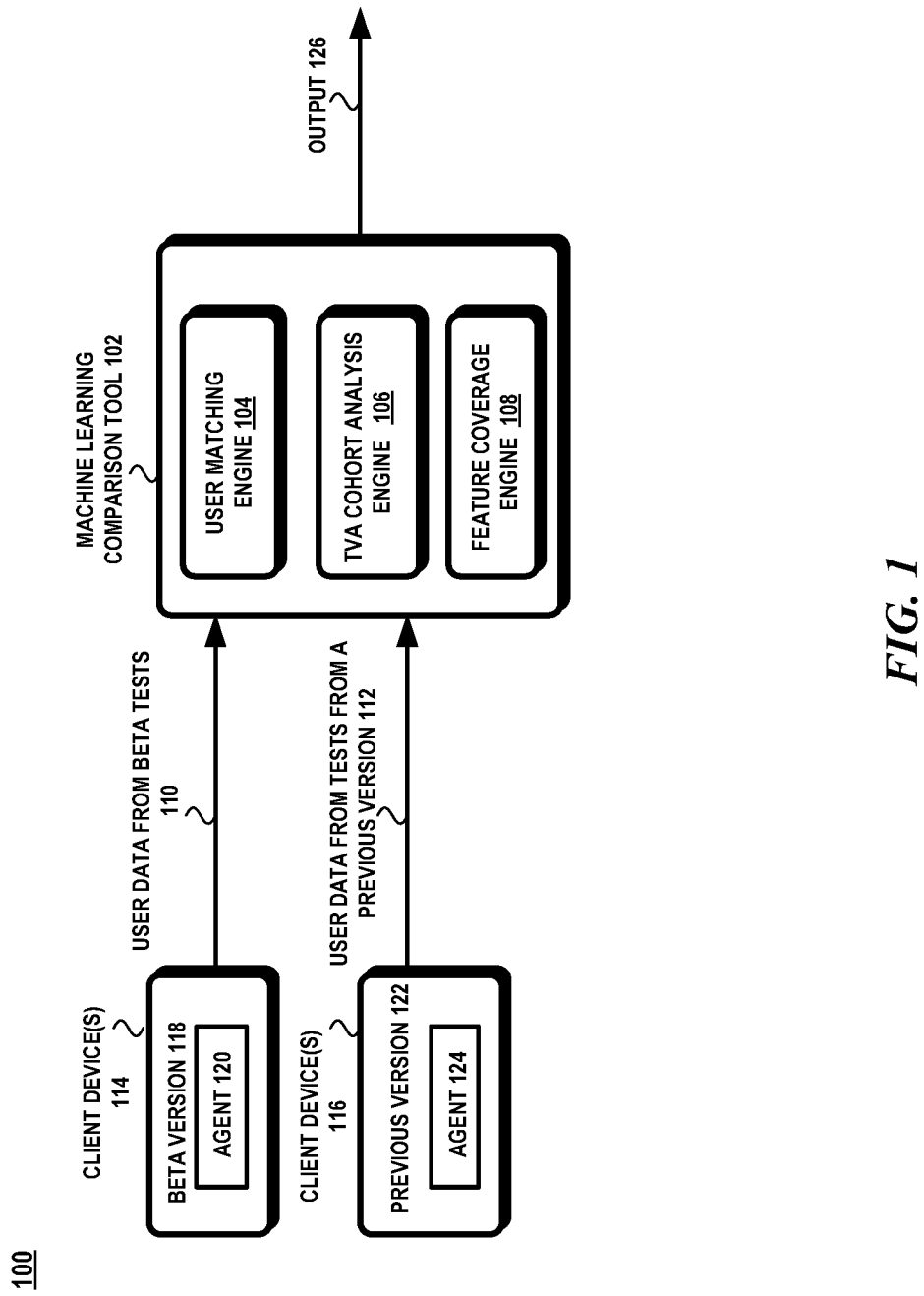
FIG. 1 illustrates an exemplary system utilizing machine language comparison tools.

FIG. 1 illustrates a block diagram of an exemplary system 100 in which various aspects of the invention may be practiced. As shown in FIG. 1, system 100 includes a machine learning comparison tool 102 that includes a user matching engine 104, a TVA cohort analysis engine 106, and a feature coverage engine 108. Any one or more of the user matching engine 104, the TVA cohort analysis engine 106, and the feature coverage engine 108 may be exercised at any point in time. The user matching engine 104, the TVA cohort analysis engine 106, and the feature coverage engine 108 may be embodied, in one or more aspects, as a program or module containing instructions executable by one or more processors.

The user matching engine 104 adjusts the user population of the beta tests to closely match the user population of the release version so that a fair comparison of the reliability metrics from both sources can be made. The user matching engine 104 makes a comparison of the metrics from the release version with the metrics from an adjusted user base. The user matching engine 104 determines whether the differences between the metrics in both versions is significant and based on that significance determination, the user matching engine 104 predicts whether a metric for the beta version is more or less reliable than the previous version. The user matching engine 104 also generates a confidence indicator to represent the quality of the matched pairs since it effects the quality of the reliability prediction. There may be situations where users are matched with other users having a low similarity thereby affecting the quality of the reliability prediction. The confidence indicator indicates the quality of the prediction as low, medium or high.

The TVA cohort analysis engine 106 uses machine learning techniques to account for the changes over time in the metrics for the users in the group of users that tested the previous version of the program. The users' metrics from the previous release may have changed over time due to changes in the input data that is used in a test and/or in the user's testing environment.

The feature coverage engine 108 uses machine learning techniques to ensure that features in a beta version have been utilized sufficiently in order to utilize the results from the beta tests. Features of a program may be underutilized in the beta tests compared with the amount of usage that the feature obtained in a previous version thereby failing to provide enough results to provide useful insight into the performance of these features.

The machine learning comparison tool 102 receives user data from the beta tests 110 and user data from tests of a previous version of the software program 112. The beta version of the software program 118 may be executed by a group of users using one or more client devices 114 and the previous version 122 of the software program may have been executed by another group of users using client devices 116. Some of the users of the beta test maybe included in the group of users having tested the previous version of the software program.

The user data from the beta testing 110 may be collected through an agent 118 inside the beta version 118 of the software program. The agent 120 monitors the behavior of the executing software program and generates metrics representing a measurement of a characteristic of the performance or usage of the software program. These metrics are transmitted to the machine learning comparison tool 102. Likewise, the user data from testing a previous version of the program 112 is generated from an agent 124 inside the previous version 122 which measures the metrics of the software program and transmits them to the machine learning comparison tool 102.

The users in either test may utilize different types of client devices 114, 116 to execute a respective test, employ different operating systems, run different types of a program, use different features in the program, and so forth. The user data 110, 112 may also include usage features that describe the characteristics of the user's testing environment, such as without limitation, the type of client device, the processor speed of client device, the operating system used in the client device, the user's engagement level, and so forth. The usage features may be machine generated or the usage features may be manually selected.

The machine learning tool 102 outputs a variety of different information 126 about the performance and reliability of the beta version that is used to fine tune the beta tests and/or the beta version of the program. For example, this output may be used to reconfigure the beta tests to obtain additional data and/or additional users so that a more accurate comparison may be made to predict the reliability and performance of the beta version. The output from the machine learning comparison tool 126 may be implemented in any form and in any media, such as without limitation, visualization, reports, user displays, and etc.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the techniques described herein are not limited to a beta version and previous version of a program and can be applied to any two or more different versions of a program.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

User Matching Engine

The user matching engine predicts the reliability of the beta version before it is released. The prediction is based on a comparison of the metrics from the beta version with the metrics from a previous version where the user population is adjusted to match the user population of the previous version. The reliability may indicate that the beta version is less reliable or more reliable than the previous version for certain metrics and the confidence level of the prediction.

Reliability refers to the ability of a version of the program to perform consistently well. The attributes used to characterize reliability may include crash rate, hang rate, etc. A crash rate is the frequency in which the program stops functioning properly and exits. A hang rate is the frequency in which the program ceases to respond. Performance of a program measures different behaviors of the program, such as without limitation, how long the program takes to startup, how long the program takes to load a solution, how long it takes to execute a particular feature, and so forth.

The user population refers to the set of observations that can be made in a test. In one aspect, the user population includes the usage features. Usage features attributed to a user's usage of the program may differ significantly such that it will adversely affect the comparison of the metrics from the beta tests with the metrics from a previous version of the program. In one aspect, the features that have the most effect on the performance and reliability of the program are selected as the usage features. The usage features consider the user's usage and the user's testing environment and may include without limitation the type of computing device or machine in which the user runs the tests, the type of the program the user is testing with and the engagement level of the user. A program may be configured for different execution environments producing different types of the same program. The types of a program may include enterprise, professional, or community. An enterprise type may be configured for a business or company, a professional type may be configured for a specific group of expert users, and a community type may be an open source or free version of a program. The engagement of a user may indicate the number of times the user used the program, the number of times a particular feature of the program was used, the number of commands initiated by the user, the number of user sessions per test and so forth.

The usage features are used to match a user from the previous version with a user in the beta version having similar usage features. The metrics of the matched users are averaged. A student t test is used to determine the differences between the averaged metrics from the matched users in order to predict the reliability of a metric of the beta version.

Figure 2:
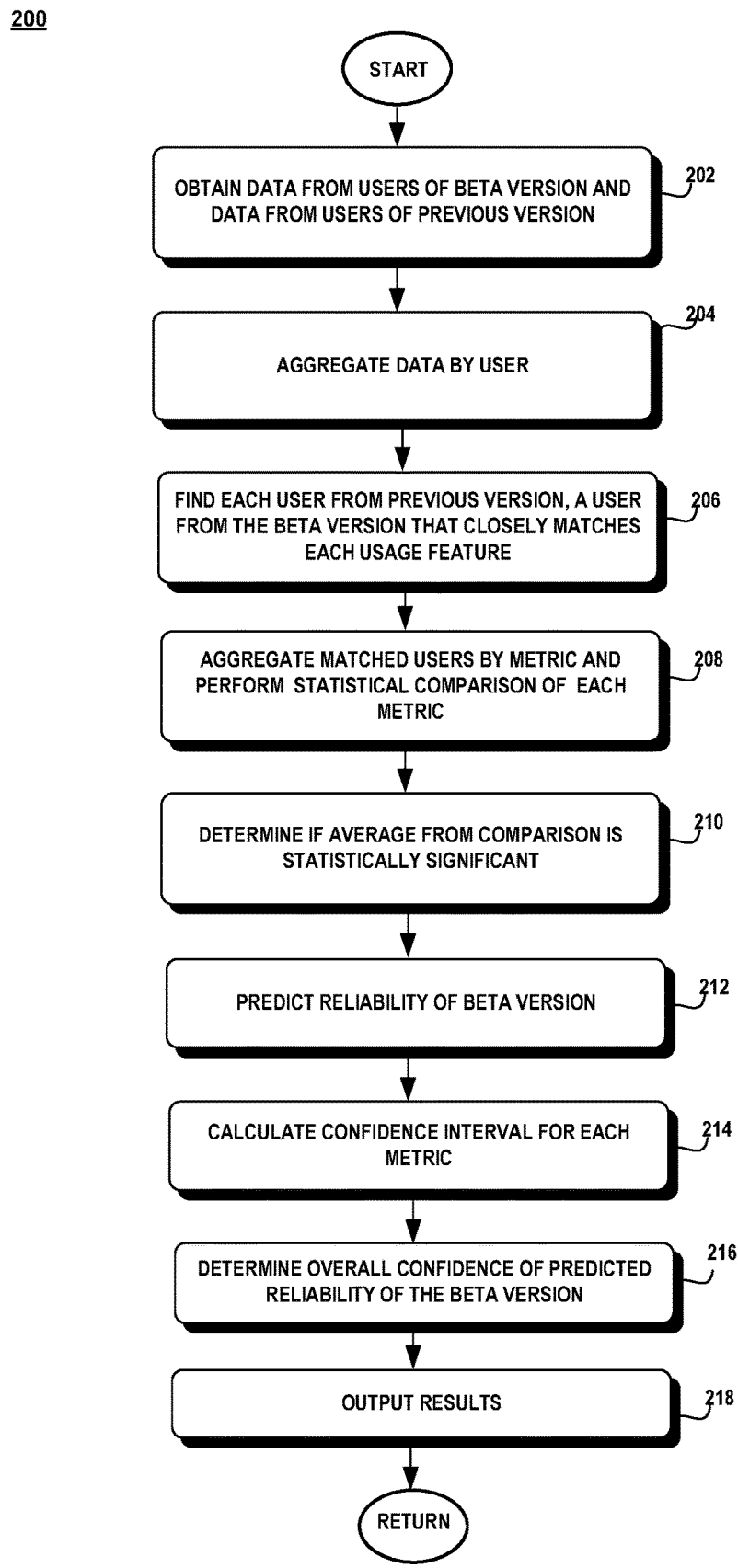
FIG. 2 is a flow diagram illustrating an exemplary method of the user matching engine.

Turning to FIG. 2, there is shown an exemplary method 200 of an aspect of the user matching engine. The user matching engine receives the user data from users testing the beta version of the program and the user data from users having tested a previous version of the program (step 202). The user data includes values or samples for each usage feature and values or samples for each metric.

Figure 3:
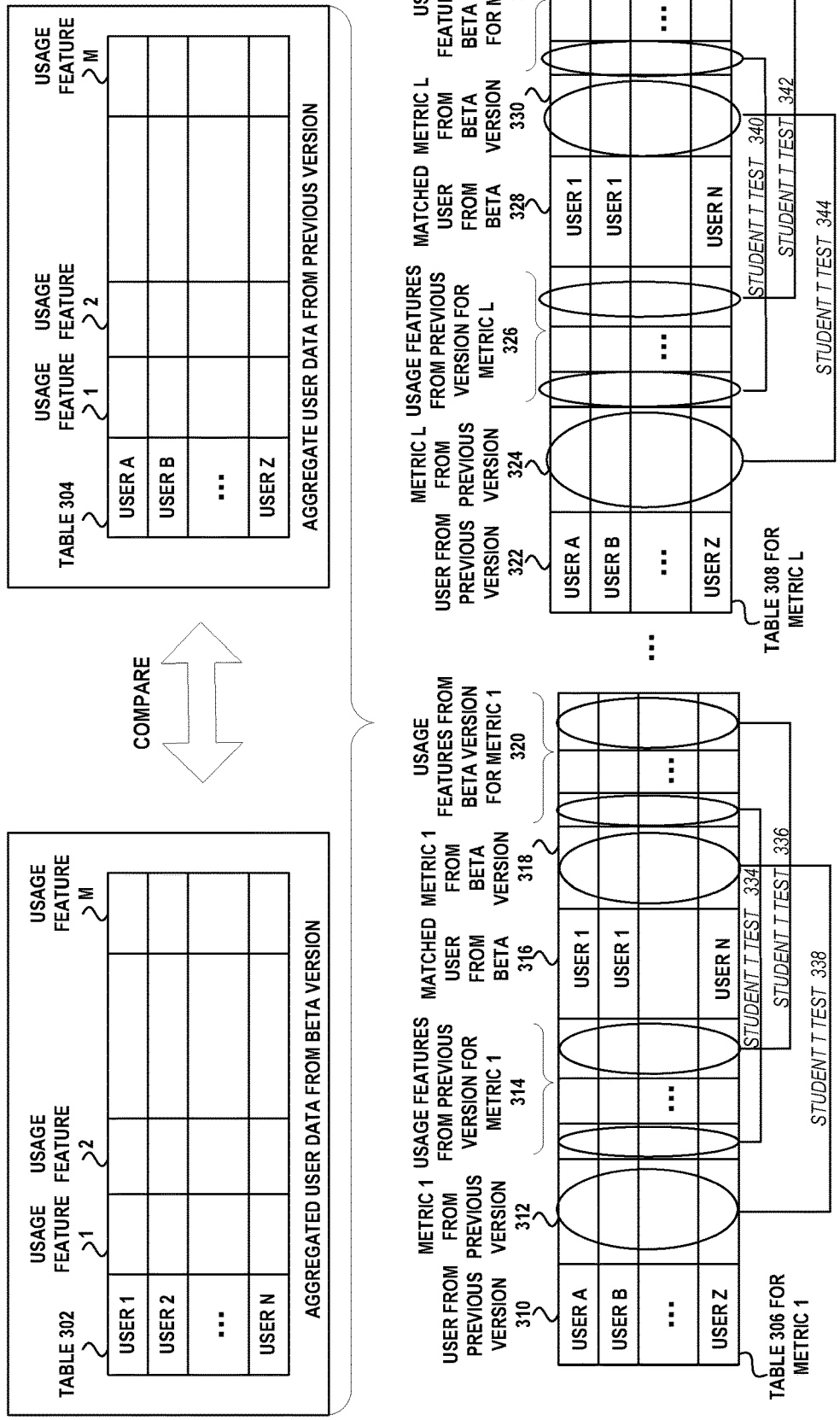
FIG. 3 is a schematic diagram illustrating the statistical techniques used to perform user matching and the prediction of the reliability of each metric of the beta version.

This user data is then aggregated by the version tested (step 204). As shown in FIG. 3, table 302 represents the aggregated user data from the beta tests which includes a value for each usage feature (usage feature 1 . . . usage feature M) for each user (user 1 . . . user N) and table 304 represents the aggregated user data from the tests on the previous version which includes a value for each usage feature (usage feature 1 . . . usage feature M) for each user (user 1 . . . user Z).

Each user in the group of previous testers is matched with a user in the group of beta testers (step 206). The match is based on the similarity between the values for each usage feature of each user. The similarity can be determined by computing the generalized Mahalanobis distance between the value for each usage feature for a user in the group of previous testers with the value for a corresponding usage feature of a user in the group of beta testers. The generalized Mahalanobis distance test is a measure of the distance between a sample P and a distribution D and may be represented as follows:

$$D_M(\overline{x}) = \sqrt{(\overline{x}-\overline{\mu})^T S^{-1}(\overline{x}-\overline{\mu})},$$

where $\overline{x}=(x_1, \ldots, x_N)^T$, $x_i$ is a sample from a set of samples with mean $\overline{\mu}=(\mu_1, \ldots, \mu_N)^T$ with covariance matrix S.

Each pair of matched users is aggregated by each metric so that the average and variance of the metric between the matched users can be determined (block 208). For example, as shown in FIG. 3, there is a separate table for each of the L number of metrics. Table 306 represents data associated with metric 1 which includes each user from the previous version 310 (user A . . . user Z) that was matched with a user from the beta version 316 (user 1 . . . user N), the values of metric 1 from the previous version 312, the usage features associated with metric 1 from the previous version 314, the values of metric 1 from the beta version 318, and the usage features associated with metric 1 from the beta version 320. Table 308 represents metric L which includes each user from the previous version 322 (user A . . . user Z) that was matched with a user from the beta version 328 (user 1 . . . user N), the values of metric L from the previous version 324, usage features associated with metric L from the previous version 326, the values of metric 2 from the beta version 330, and the usage features associated with metric L from the beta version 332.

Each table 306, 308 lists the matched users in a separate row along with their respective values for the metric associated with the table and the usage features associated with the metric. The values of the metrics from the previous version and the beta version are averaged, using the mean or simple average, and the variance is computed for each of the respective aggregated metrics (block 208). The variance is the average of the squared differences from the mean.

Next, a student t test is computed for each metric using the averages and variances for each metric (block 208). As shown in FIG. 3, the student t test is computed for each metric of a matched pair of users 338, 344. A student t test or t test compares two averages or means to determine if the two averages are different and the significance of the difference. In this case, the student t test is used to determine if the metrics from the beta version and the previous version are different and the significance of the difference. The student t test generates a t test statistic value, t, which is represented mathematically as follows:

$$t = \frac{M_A - M_B}{\sqrt{\frac{S_A^2}{n_A} + \frac{S_B^2}{n_B}}},$$

where A are the users of the previous version, B are the users of the beta testers, MA and MB represent the means of groups A and B respectively, SA and SB represent the sample variance of group A and B respectively, $n_A$ and $n_B$ represent the size of groups A and B respectively.

Once the t test statistic value t is generated, the t test table is consulted to obtain the critical value of the student's t distribution corresponding to the predetermined significance level alpha (block 210). In one aspect, the significant level alpha may be 5%. If the absolute value of the t test statistic, |t|, is greater than the critical value, then the difference is significant. Otherwise, the difference is not significant. When the difference is significant, the sign of the t test statistic is used to decide if the metrics is larger or smaller than the beta version. When the difference is not significant, the reliability of the beta version is the same as the previous version (block 212).

A confidence interval for each metric may be calculated to reflect the confidence of the conclusion of the predicted reliability of the beta version (block 214). The confidence interval for each metric may be represented mathematically as: mean±1.96 √variance where the mean and variance are with respect to the metric of the previous version.

Next, the overall confidence of the predicted reliability of the beta version is determined by comparing the differences in the matched usage features (block 216). The average and standard deviation of each usage feature associated with a metric of the previous version and the beta version is computed. As shown in FIG. 3, the student t test is computed for each matched usage feature of a metric 334, 336, 340, 342 to decide if there is a significant difference between the usage features of the users of the previous version and the usage features of the users of the beta version (block 216).

Based on the student t test, a feature level confidence is assigned to each usage feature (block 216). If the student t test statistic is larger than 0.05, a high confidence is assigned to the usage feature. If the student t test statistic is between 0.05 to 0.01, a medium confidence is assigned to the usage feature. If the student t test statistic is smaller than 0.01, a low confidence is assigned to the usage feature.

The overall confidence is then determined based on the confidences assigned to each usage feature (block 216). If all the usage features are assigned high confidence, then the overall confidence level is high. If at least one usage feature is assigned low confidence, then the overall confidence is low. Otherwise, the overall confidence is medium.

Figure 4:
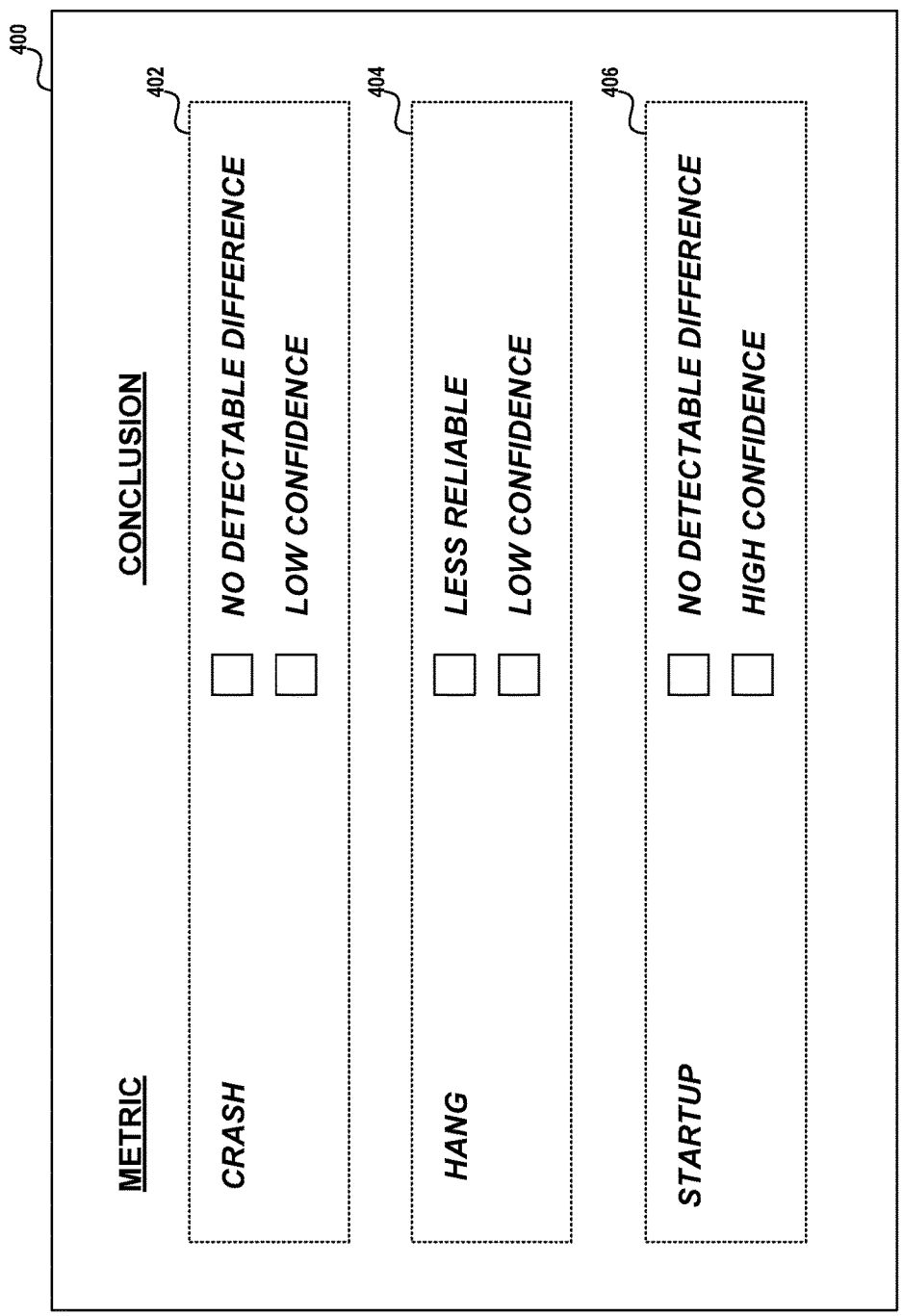
FIG. 4 illustrates an exemplary display showing the results from the user matching engine.

The results of the user matching engine are output (block 218). FIG. 4 illustrates an exemplary screenshot 400 indicating the conclusions generated from the user matching engine for a metric. As shown in FIG. 4, for the crash metric or crash rate of the beta version, the beta version of the program has no detectable difference in its crash rate from the previous version and its confidence level is low (block 402). For the hang metric or hang rate of the beta version, the beta version of the program is less reliable than the previously-previous version of the program and the confidence level is low (block 404). For the startup performance metric of the beta version, the beta version has no detectable difference in its startup metric from the previous version and its confidence level is high (block 406).

Attention now turns to discussion of the machine learning techniques used in the time variability engine.

TVA Cohort Analysis Engine

The TVA cohort analysis engine accounts for the changes in the previous version of the program over time which can affect any comparison of its metrics with the metrics of the beta version. To account for the changes over time in the metrics of a program for a user, the TVA cohort analysis engine obtains user data of a previous version before (first time period) and after (second time period) the release of beta version of users who use previous version in two time periods, and user data of previous version in first time period and of beta version in second time period of users who adopted both version. The difference between the metrics of the sets of user data from a particular user is compared using the Mann Whitney U test. Mann Whitney U test statistics from user data in previous version in first and second periods is used to determine the difference in the distribution of the sets of metrics. Two critical values are formulated from the distribution and compared with Mann Whitney U test statistics from users in previous version in first time period and beta version in second time period to determine whether the beta version for a particular user is faster or slower than the previous version. Then, aggregate the comparison conclusion from a single user who uses the beta version and the previous version to conclude whether the beta version is better, worse or of no difference than the previous version.

Figure 5:
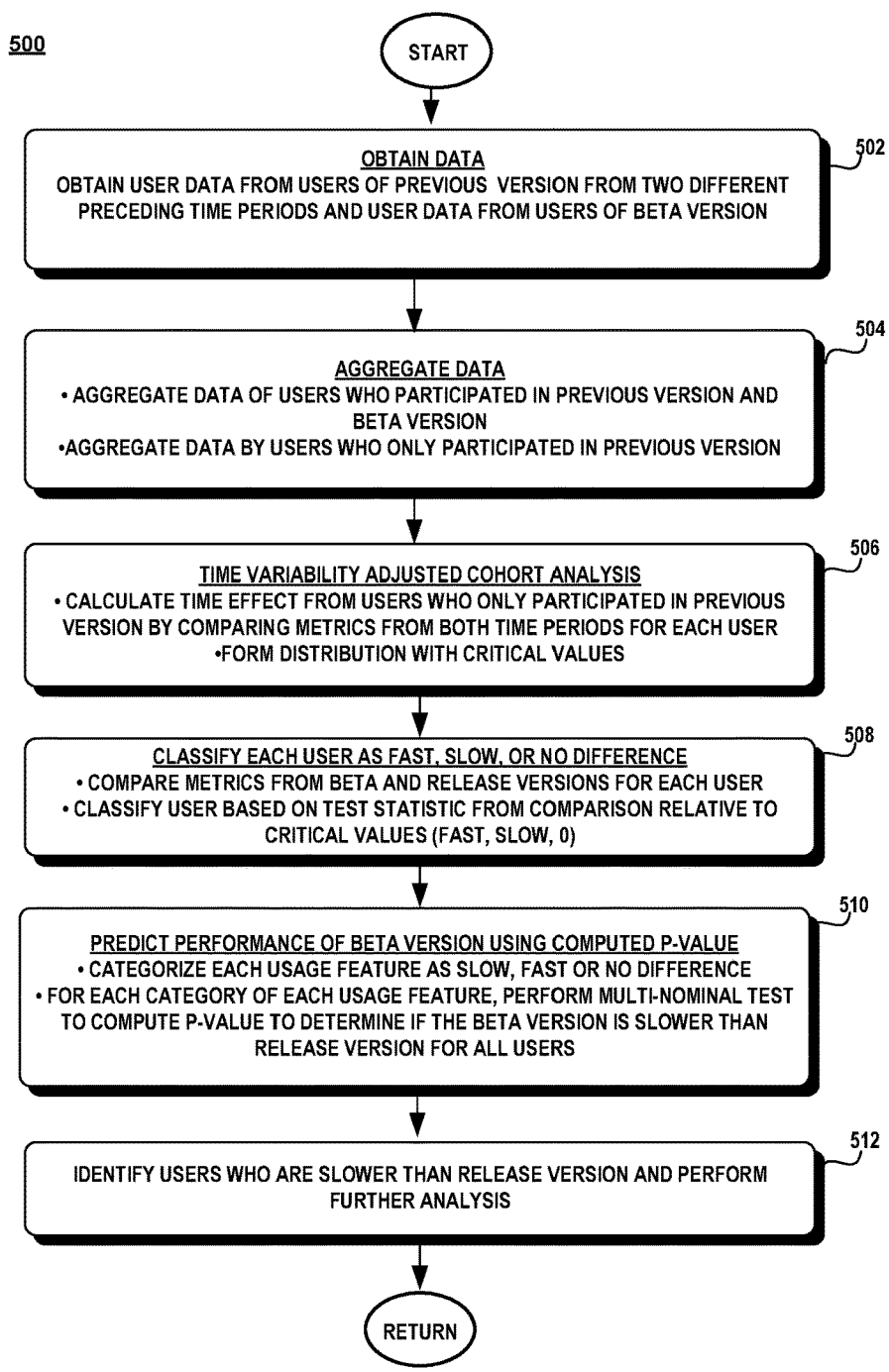
FIG. 5 is a flow diagram illustrating an exemplary method of the TVA cohort analysis engine.

Turning to FIG. 5, there is shown an exemplary method 500 of the TVA cohort analysis engine. The TVA cohort analysis engine obtains user data from the users of a beta version and user data from users who tested the previous version at a first time period and at a second time period (block 502). In one aspect, the first time period and the second time period are different time periods and both are before the release of the beta version. The first time period can cover the first five days before the release of the new version and the second time period can cover the time range from the tenth day before the release to the sixth day prior to the release.

Figure 6:
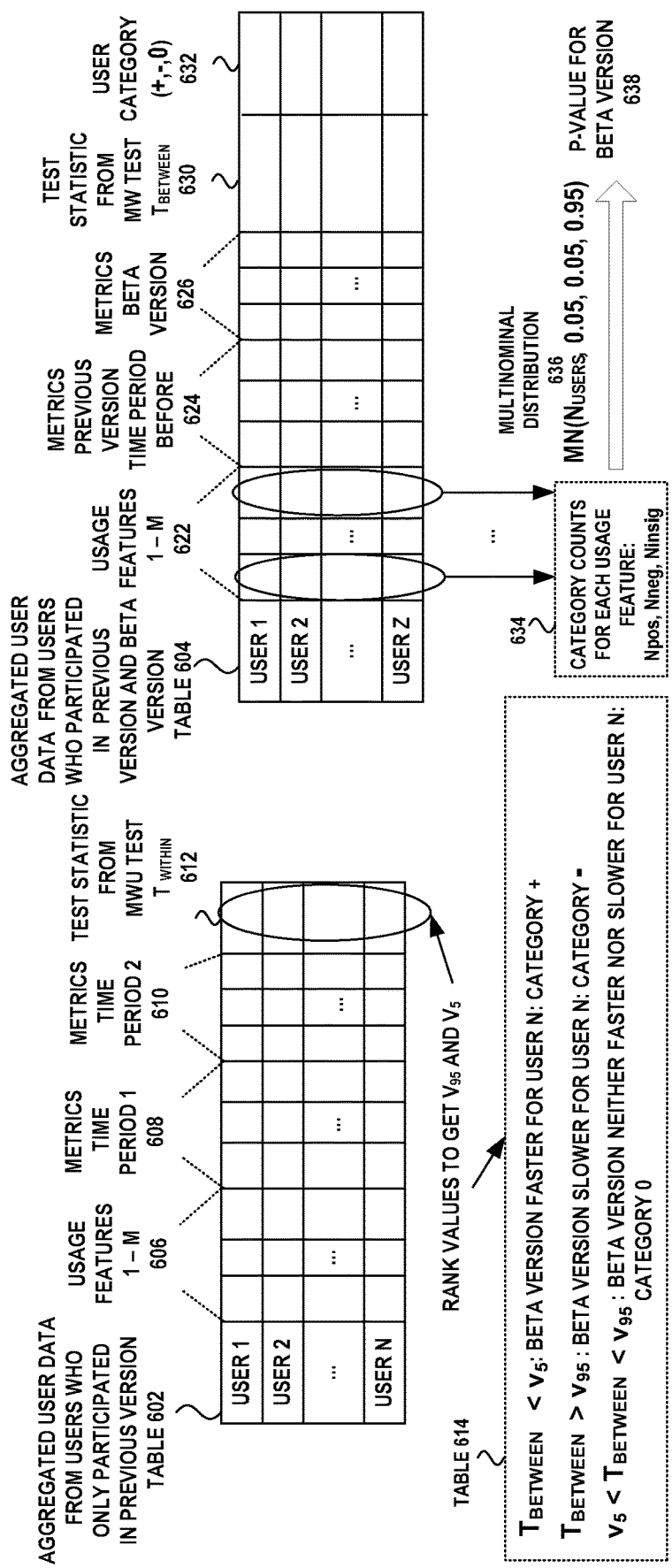
FIG. 6 is a schematic diagram illustrating the statistical techniques used to predict the performance of a beta version of a program for a particular beta test user based on a comparison with the release version where the comparison accounts for changes in the user's metrics of the release version over time.

The user data is aggregated into two groups: users who only tested the previous version and users who tested both the beta version and the previous version (block 504). Turning to FIG. 6, there is shown the aggregation of the users who tested the previous version in table 602 and the aggregation of the users who tested both versions in table 604. Table 602 lists each user in a separate row (user 1 . . . user N) along with the usage features of the user 606 (usage features 1-M) and the metrics from time period 1 608 and the metrics from time period 2 610. The usage features 606 may include the machine used in the test, the type of processors in the machine, the engagement level of the user, the type of the program (enterprise, professional, community), and so forth. The metrics for time period 1 and time period 2 may include performance metrics such as how long a particular feature executed, how long it took the program to load, how long it took the program to startup, the frequency of crashes, the frequency of hangs, and so forth.

Turning back to FIG. 5, a cohort analysis is performed to determine the time effect between the metrics from the two time periods by calculating a test statistic, $T_{WITHIN}$, for each user that only participated in the previous version testing using a Mann-Whitney U test (block 506). The Mann-Whitney U test is used to determine the differences between the distribution of the metrics from the first-time period and the metrics from the second-time period. As shown in FIG. 6, table 602 includes the test statistic from the Mann Whitney U test 612 for each user which is denoted as $T_{WITHIN}$. The test statistic, $T_{WITHIN}$, from the users who only participated in the previous version is used to establish the critical values for the 95% percentile, $V_{95}$, and the 5% percentile, $V_5$, which is later used to test if the beta version is faster or slower than the previous version as shown by the formulas in box 614.

The performance of the beta test from each user having tested both versions is determined by comparing the metrics from the user's beta test with the metrics from the user's release version. The results of this comparison are used to characterize a user's beta test results as being slower (−), faster (+) or having no difference (0) than the results from testing the release version (block 508). The comparison involves comparing each metric for each user in the beta version with a corresponding metric for each user in the previous version (block 508). The metrics from the previous version may be taken five days before the release of the beta version to calculate the test statistic, $T_{BETWEEN}$ for each user (block 508). If the value of $T_{BETWEEN}$ for a user is greater than the critical value for $V_{95}$, then the user's beta test results is characterized as being slower than the previous version ("−") for that user (block 508). If the value of $T_{BETWEEN}$ for a user is less than the critical value for $V_5$, then the user's beta test results is characterized as being faster than the previous version ("+") for that user (block 508). If the value of $T_{BETWEEN}$ for a user is between the critical value for $V_5$ and $V_{95}$, then the user's beta test results are characterized as not being faster or slower than the previous version ("0") for that user (block 508). Hence, for each user, the TVA cohort analysis engine determines whether the beta version is faster or slower than the previous version or that no difference was detected.

To determine if the beta version is faster or slower for all the users, the overall p-value can be computed (blocks 510). This is done by determining for each usage feature, the number of faster users (category +), $N_{pos}$, the number of slower users (category −), $N_{neg}$, and the number of insignificant users (category 0), $N_{insig}$ (block 510). Turning to FIG. 6, each column that represents a usage feature is analyzed to compute the counts for a respective usage feature. The counts for each usage feature, Npos, Nneg, and Ninsig, is shown schematically in box 634 of FIG. 6.

For each usage feature, a multi-nominal distribution is applied to compute $N_{pos}*$, $N_{neg}*$, $N_{insig}*$ from $N_{pos}$, $N_{neg}$, and $N_{inseg}$ (FIG. 5, block 510; FIG. 6, 636). The p-value is then calculated and used to identify for all users, whether the new version is faster or slower than the previous version (FIG. 5, block 510; FIG. 6, 638). The p-value may be calculated as follows:

New version is faster when $P[(N_{pos}*-N_{neg}*)>(N_{pos}-N_{neg})]$, and

New version is slower when $P[(N_{pos}*-N_{neg}*)<(N_{pos}-N_{neg})]$.

In the case where the beta version is identified as being faster overall, the users who were identified as performing slower than the previous version are identified (block 512). These slower users are then further analyzed to find out why the beta version does not perform faster for these users (block 512).

FIG. 10 illustrates an exemplary output 1000 from the TVA cohort analysis engine. There is shown a dimension value or the name of the program analyzed 1002, the conclusion 1004, the confidence 1006, the total number of matching users 1008, the percentage of faster users and the number of faster users 1010, and the percentage of slower users and the number of slower user 1012. As shown in FIG. 10, the Pro Version of Program A is faster than the previous version and the Community Version of Program A is slower than the previous version. The confidence of both conclusions is high. For the Community Version of Program A, the total number of matching users is 15,553, the number of users faster than the previous version is 782 with a corresponding percentage of 5.03%, and the percentage of users slower than the previous version is 1502 with a corresponding percentage is 9.67%. For the Pro Version of Program A, the total number of matching users is 2354, the number of users faster than the previous version is 686 with a corresponding percentage of 29.14% and the number of users slower than the previous version is 142 with a corresponding percentage of 6.03%.

Attention now turns to a discussion of the machine learning techniques used in the feature coverage engine.

Feature Coverage Engine

In order to compare the performance and reliability of the features in the beta version with the performance and reliability of the features in a previous version, there needs to be a similar amount of users that used the features in the beta test as there were in the group that tested the previous version. Also, the usage of a feature in the beta test needs to be similar to the usage of the feature by the users in the group that tested the previous version in order for there to be a fair comparison from which a valid conclusion can be made.

Figure 7:
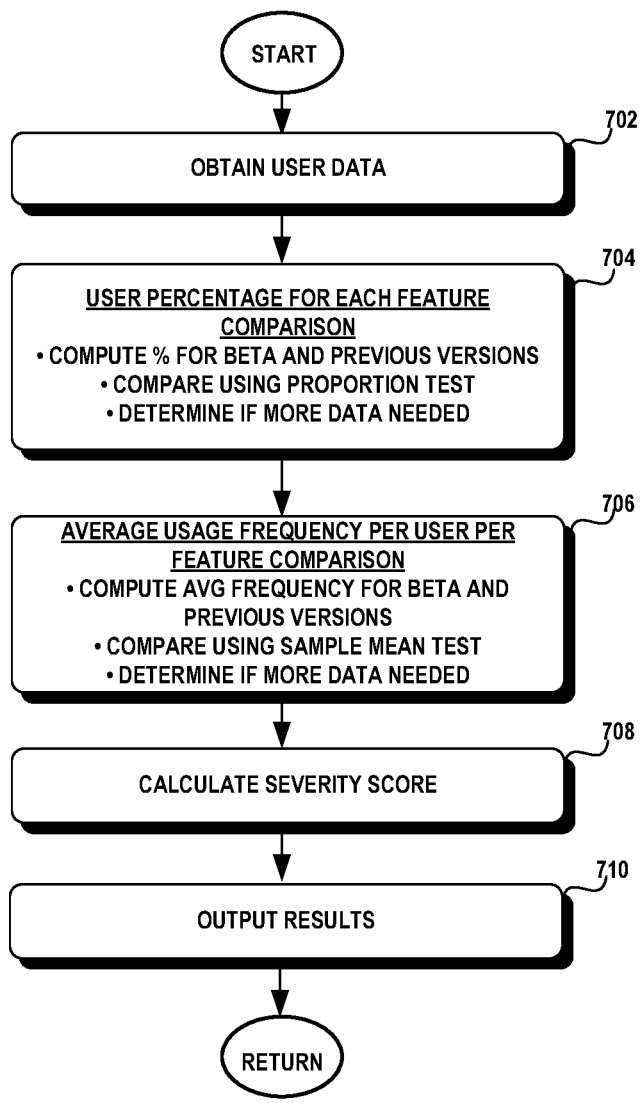
FIG. 7 is a flow diagram illustrating an exemplary method of the feature coverage engine.

Turning to FIG. 7, the feature coverage engine 108 determines whether there were enough users using a feature, when compared with the users that tested the previous version, and whether the users used the feature enough, when compared with the users that tested the previous version. The feature coverage engine 108 makes this determination in order to ensure that the comparison between the results of the beta version and the previous version derives valid conclusions from the beta test metrics.

Initially the feature coverage engine receives user data from the users testing the beta version of the program and from the users that have tested a previous version of the program (block 702). The user data includes for each user in the beta test group and for each user in the previous version test group, the number of users in either test group, the features used by each user in each test group, and the number of times each feature was used by each user in each test group (block 702).

A comparison is made between the number of beta test users and the number of users of the previous version to determine the percentage of users that utilized each feature (block 704). For each feature, the percentage of users (i.e., user percentage) in each test group that utilized a feature may be calculated as follows:

$$\text{User Percentage For Feature in Beta Version} = \frac{\text{number of beta test users who used feature } i}{\text{number of users in the beta test group}}, \text{ and}$$

$$\text{User Percentage For Feature in Previous Version} = \frac{\text{number of users in previous version group who used feature } i}{\text{number of users in the previous version test group}}.$$

A hypothesis test of the proportions is performed to compare the user percentages for a feature within the users in the beta test group with the users in the previous test group in order to determine if there is a significant difference between the usage of the features in both groups of test users (block 704). In the hypothesis test of the proportions, a significance level of 0.05 is selected and two-sample proportion test is used to determine whether the user population in the beta test version differs significantly from the user proportion in the previous version for a given feature. Using the sample data, the test statistic is computed and its associated p-value. The standard deviation, δ, is computed for the sampling distribution, where $$\delta = \sqrt{\frac{P*(1-P)}{n}},$$

where P is the proportion of the users using a given feature from both the previous version and the beta version and n is the total sample size from the previous version and the beta version. The test statistic is the z-score defined by the following $$z = \frac{(p_1 - p_2)}{\delta},$$

where $p_1$ is the user proportion of the beta testers and $p_2$ is the user proportion of the previous version for a given feature. The p-value is the probability of observing a sample statistic as extreme as the test statistic. The z-score is associated with a normal distribution. The probability associated with the z-score uses a normal distribution calculation to calculate the p-value.

When the proportion test results in a p-value of test statistic greater than 0.05 for a feature, the feature coverage is then determined to be sufficient (block 704). If the p-value of the test statistic is less than or equal to 0.05, the feature coverage is insufficient (block 704).

The feature coverage engine then determines the average number of times that each user in each group used the feature (block 706). The average usage frequency for each feature by each user is computed as follows:

Average Usage Frequency Per User for Feature i in Beta Test Group:

$$\frac{\text{number of times feature } i \text{ is used in beta test group}}{\text{total number of users who used feature } i \text{ in beta test group}}$$

and Average Usage Frequency Per User for Feature i in Previous Version Test Group:

$$\frac{\text{number of times feature } i \text{ is used in previous version test group}}{\text{total number of users who used feature } i \text{ in previous version test group}}$$

The feature coverage test engine then compares the average usage frequency for each feature in the beta test with the average usage frequency per user for each feature in the previous version test by using a two-sample t-test for equal means (block 706). The two-sample t-test is used to determine if the two usage frequency means are equal.

The two-sample t test uses a null hypothesis that the two means are equal and the alternate hypothesis assumes that the two means are not equal. The two-sample t test is represented mathematically as follows:

Test statistic:

$$T = \frac{Y_1 - Y_2}{\sqrt{\frac{s_1^2}{N_1} + \frac{s_2^2}{N_2}}},$$

where $N_1$ and $N_2$ are the sample sizes, $Y_1$ and $Y_2$ are the sample means, and $s_1^2$ and $s_2^2$ are the sample variances. The critical regions is $|T|>t_{1-\alpha/2, \nu}$, where $t_{1-\alpha/2, \nu}$ is the critical value of the t distribution with v degrees of freedom. When the absolute value of the test statistic is greater than the critical value, then the two population means are different at the 0.05 significance level and therefore the user data from the beta tests is insufficient to make any predictions (block 706).

A severity score is calculated for each feature as the sum of the standardized user percentage difference between the beta and previous versions and the standardized average usage frequency per user difference of a feature from the beta and previous versions (block 708). The severity score represents the severity of each feature needing more test data in order to derive any meaningful conclusions for the beta version. The severity scores are ranked so that the minimum value represents 0% and the maximum value represents 100%. By default, the feature coverage engine sets the ranked severity score at 90% so only the top 10% of features that need most users and usage are included for immediate action.

Referring to FIGS. 8A-8B, there are shown exemplary displays exhibiting the results of the feature coverage engine. FIG. 8A illustrates a first display 800 that lists in a tabular format each feature and the following data for each feature: the name of the feature 802; the number of users in the beta version that used the feature 804; the number of users in the previous version that used the feature 806; the user percentage for the feature in the beta version 808; the user percentage for the feature in the previous version 810; the average usage frequency for the feature in the beta version 812; the average usage frequency for the feature in the previous version 814; and the ranked severity score 816.

As shown in 8A, the feature "feature 1" has 39 users using the beta version, 265,605 users using the previous version, 0.22% of the users of the beta version use "feature 1", 7.64% of the users of the previous version use "feature 1", the average usage for "feature 1" in the beta version is 47, and the average usage for the feature in the previous version is 43, and the severity score is 97.23%.

Likewise, the feature "feature 2" has 10 users using the beta version, 47 users using the previous version, 0.06% of the users of the beta version use the feature, 0.00% of the users of the previous version use the feature, the average usage for the feature in the beta version is 25, and the average usage for the feature in the previous version is 438, and the severity score is 99.59%.

FIG. 8B illustrates a second display 818 that lists in a tabular format each feature and the following data for each feature: the name of the feature 820; whether the feature only had enough users using the feature 822; whether the feature only had enough usage of a feature by the users in the beta test 824; whether the feature had enough users using the feature and enough usage by the users 826; and whether there was not enough usage of the feature by the users in the beta test or not enough usage of the feature by the users in the beta test 828.

As shown in FIG. 8B, the feature "feature 1" only has enough feature usage in the beta version and the feature "feature 2" only has enough users.

Technical Effect

Aspects of the subject matter disclosed herein pertain to the technical problem of predicting the performance and reliability of a new version of a program when using metrics obtained from tests performed under varying conditions. The technical features associated with addressing this problem uses machine learning techniques to account for differences in the users' usage in different environments in order to ensure that there is a fair comparison of the metrics. The machine learning techniques utilize statistical processes in a non-conventional manner to uncover hidden insights in the metrics which can be adjusted to account for these differences.

The user matching engine uses a machine learning technique to adjust the user base of the users testing the new version of a program in order to compare metrics that are more closely related between users having a similar testing environment. The time variability cohort analysis engine uses a machine learning technique to consider the differences in the metrics of the base version of a program that may have changed over time due to changes in the base version of the program. The feature coverage uses a machine learning technique to determine whether the metrics reflect sufficient testing of features of the program in both versions for any conclusion to be drawing from a comparison of the metrics. The comparison of the metrics in this manner ensures that the predicted performance and reliability of the new version leads to more valid conclusions.

Exemplary Operating Environment

Figure 9:
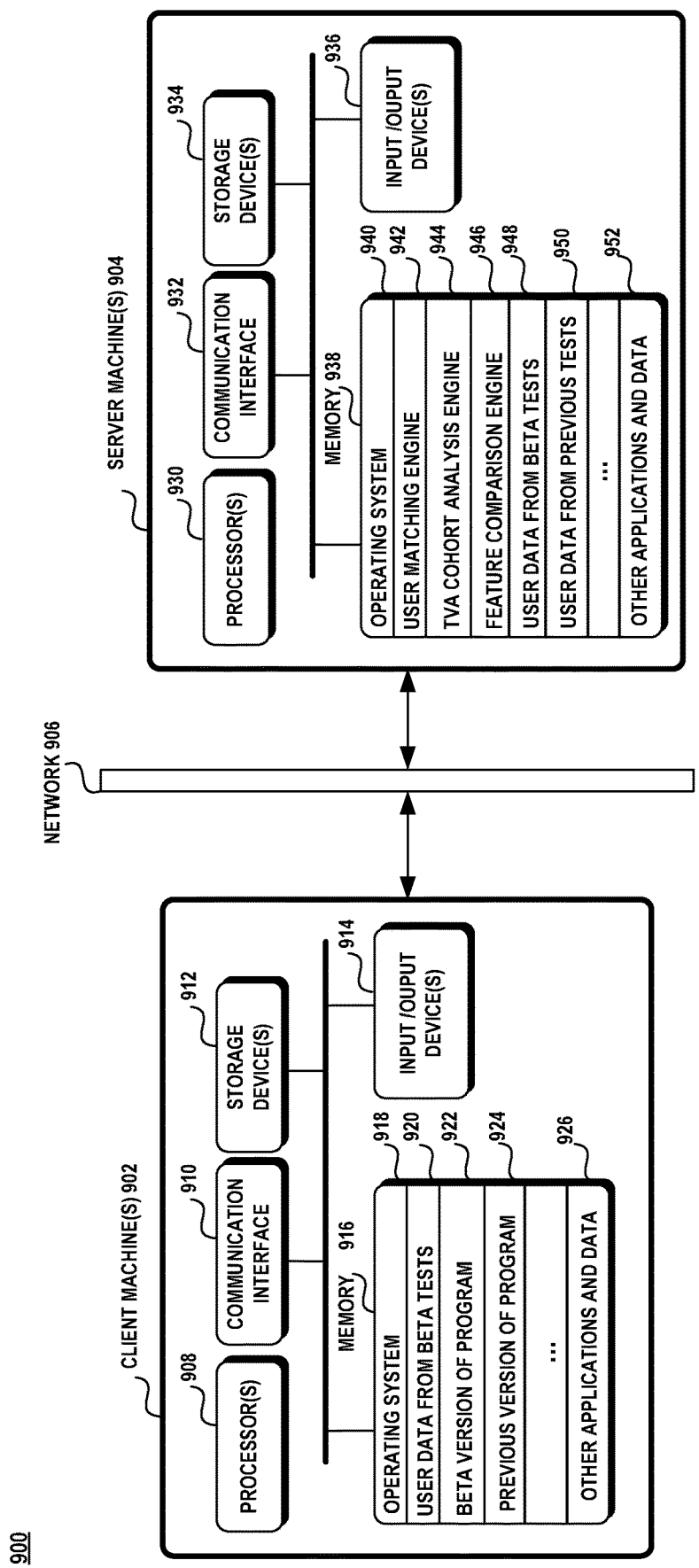
FIG. 9 is a block diagram illustrating an exemplary operating environment.

Attention now turns to a discussion of an exemplary operating embodiment. FIG. 9 illustrates a first exemplary operating environment 900 that includes one or more client machines 902 connected to one or more server machines 904 through a network 906. The client machines 902 and the server machines 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A client machine 902 may include one or more processors 908, a communication interface 910, one or more storage devices 912, one or more input and output devices 914, and a memory 916. A processor 902 may be any commercially available or customized processor and may include dual microprocessors and multi-processor architectures. The communication interface 910 facilitates wired or wireless communications between the client machines 902 and other devices. A storage device 912 may be a computer-readable medium that does not contain propagating signals, such as modulated data signals transmitted through a carrier wave. Examples of a storage device 912 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 912 in the client machines 902. The input devices 914 may include a keyboard, mouse, pen, voice input device, touch input device, etc., and any combination thereof. The output devices 914 may include a display, speakers, printers, etc., and any combination thereof.

The memory 916 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 916 may also include one or more external storage devices or remotely located storage devices that do not pertain to propagated signals, such as modulated data signals transmitted through a carrier wave.

The memory 916 may contain instructions, components, and data. A component is a software program that performs a specific function and is otherwise known as a module, program, engine, and/or application. The memory 916 may include an operating system 918, user data from beta tests 920, a beta version of a program 922, a previous version of the program 924 and other applications and data 926.

A server machine 904 may include one or more processors 930, a communication interface 932, one or more storage devices 934, one or more input and output devices 936, and a memory 938. A processor 930 may be any commercially available or customized processor and may include dual microprocessors and multi-processor architectures. The communication interface 910 facilitates wired or wireless communications between the server machines 904 and other devices. A storage device 934 may be a computer-readable medium that does not contain propagating signals, such as modulated data signals transmitted through a carrier wave. Examples of a storage device 934 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 934 in a server machines 904. The input devices 936 may include a keyboard, mouse, pen, voice input device, touch input device, etc., and any combination thereof. The output devices 936 may include a display, speakers, printers, etc., and any combination thereof.

The memory 938 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 938 may also include one or more external storage devices or remotely located storage devices that do not pertain to propagated signals, such as modulated data signals transmitted through a carrier wave.

The memory 938 may contain instructions, components, and data. A component is a software program that performs a specific function and is otherwise known as a module, program, and/or application. The memory 938 may include an operating system 940, a user matching engine 942, a time variability engine 944, a feature comparison engine 946, user data from beta tests 948, user data from previous tests 950, and other applications and data 926.

In one aspect, the server machines 904 may be part of a cloud service that receives the user data from one or more client machines 902. The cloud service 904 communicates with the client machines 902 through the network 906. The network 906 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors and a memory, where the memory includes one or more modules that are configured to be executed by the one or more processors. The one or more modules perform actions that receive beta test data including usage features of each user associated with testing a beta version of a program and previous test data including usage features of each user associated with testing a previous version of the program; receive metric data including metrics associated with the beta version of the program and metrics associated with the previous version of the program; and use at least one machine learning technique to generate an estimation of the performance and/or reliability of the beta version of the program.

The machine learning techniques may include a first machine learning technique that compares samples of a first metric from a first group of users having tested the previous version of a program with samples of the first metric from a second group of users having tested the beta version of the program, wherein each user in the first group is matched with a user in the second group having a closest similarity of the usage features; a second machine learning technique that determines if there is sufficient feature coverage of one or more features tested in the beta version compared with the one or more features tested in the previous version; and a third machine learning technique that performs a cohort analysis to compare samples from metrics of the release version from at least two time periods to formulate a distribution that is used to identify performance of the release version for a user that tested the beta version.

The usage features include a plurality of features associated with a user's testing environment and/or usage of the program. The second machine learning technique compares a percentage of users testing one or more features of the previous version and a percentage of users testing the one or more features of the beta version to determine whether the beta test had insufficient coverage of the one or more features. A proportion of percentage test may be used to perform the comparison. The second machine learning technique determines whether frequency of usage of a feature by the users in the beta version is sufficient. The second machine learning technique compares an average frequency of usage of a first feature by the users of the beta version with an average frequency of usage of the first feature by the users of the release version to determine sufficiency of data for the first feature and may perform a sample mean test to perform the comparison of the average frequency of usage of a feature by the users of the beta version with an average frequency of usage of the feature by the users of the release version.

A method is disclosed that formulates, on a computing device, matched pairs of users where a matched pair includes a user having tested a previous version of a program and a user having tested a beta version of the program, the matched pair having similar usage features; averages values of a first metric from the matched pairs of users having tested the previous version and averaging values of the first metric from the matched pairs of users having tested the beta version; compares the average value of the first metric from the previous version with the average value of the first metric from the beta version to determine a significance of the difference between both average values; and generates a reliability of the first metric based on a significance of the difference between both average values.

The usage features include a plurality of features associated with a user's testing environment and/or usage of the program. The formulation of the matched pairs is determined by computing a similarity between each usage feature associated with a user in a matched pair having tested the beta version of the program with each usage feature associated with a user in the matched pair having tested a previous version of the program; and forming the matched pair with a user in the matched pair having tested the beta version with a user in the matched pair having tested the previous version having a smallest distance between each value associated with each usage feature of each user of the matched pair.

Comparing the average value of the first metric from the previous version with the averaged value of the first metric from the beta version is computed using a student t test and comparing the average value of the first metric from the release version with the average value of the first metric from the beta version further comprises testing a test statistic from the student t test for the first metric to determine that the beta version is less reliable than the release version when the test statistic is greater than a significance level and to determine that the beta version is less reliable than the release version when the test statistic is less than the significance level.

Comparing the average value of the first metric from the release version with the average value of the first metric from the beta version further comprises forming a confidence interval for each metric from the average values and variances for each metric. A confidence interval for each metric to output a confidence representing a quality of the matched pair.

A method is disclosed that compares differences between metrics from a first time period with metrics from a second time period, where the metrics are generated by users who tested a previous release of a program, the first time period and the second time period differ; formulates a test distribution from the compared differences, the test distribution including a first critical value and a second critical value; compares, for a single user, metrics from testing a beta version of the program with metrics from testing the previous version of the program, the comparison resulting in a first test statistic; and estimates the performance of the beta version for the single user based on where the first test statistic fits within the first critical value and the second critical value.

The method determines that the single user's performance of the beta version exceeds the single user's performance of the release version when the first test statistic exceeds a 95% confidence level, and that the single user's performance of the beta version is slower than the single use's performance of the release version when the first test statistic is less than a 95% confidence level. The comparison of the differences between metrics from a first time period with metrics from a second time period maybe performed utilizing a Mann Whitney U test. When comparing, for a single user, metrics from testing a beta version of the program with metrics from testing the previous version of the program, a Mann Whitney U test may be performed. The single user's performance of the beta version is neither faster or slower than the single user's performance of the release version when the test statistic lies in between the two critical values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should be noted that two versions of a program are being compared. The versions may be denoted as beta version, previous version, currently released version, etc. These names are not intended to limit or constrain the subject matter to a particular type of versions.

What is claimed:

1. A method comprising:
  receiving, on a computing device, beta test data including usage features of each user associated with testing a beta version of a program and previous test data including usage features of each user associated with testing a previous version of the program;
  receiving metric data including metrics associated with the beta version of the program and metrics associated with the previous version of the program; and
  using at least one machine learning technique to generate an estimation of the performance and/or reliability of the beta version of the program, wherein the one or more machine learning techniques is selected from among:
  a first machine learning technique that compares samples of a first metric from a first group of users having tested the previous version of the program with samples of the first metric from a second group of users having tested the beta version of the program, wherein each user in the first group is matched with a user in the second group having a closest similarity of the usage features;
  a second machine learning technique that determines if there is sufficient feature coverage of one or more features tested in the beta version compared with the one or more features tested in the previous version; and
  a third machine learning technique that performs a cohort analysis to compare samples from metrics of the previous version from at least two time periods to formulate a distribution that is used to identify performance of the previous version for a user that tested the beta version.

2. The method of claim 1, wherein the first machine learning technique performs actions comprising:
  formulating matched pairs of users, a matched pair including a user having tested a previous version of a program and a user having tested a beta version of the program, the matched pair having similar usage features;
  averaging values of a first metric from the matched pairs of users having tested the previous version and averaging values of the first metric from the matched pairs of users having tested the beta version;
  comparing the average value of the first metric from the previous version with the average value of the first metric from the beta version to determine a significance of the difference between both average values; and
  generating a reliability of the first metric based on a significance of the difference between both average values.

3. The method of claim 2, wherein formulating the matched pairs of users, further comprises:
  computing similarity between each usage feature associated with a user in a matched pair having tested the beta version of the program with each usage feature associated with a user in the matched pair having tested a previous version of the program; and
  forming the matched pair with a user in the matched pair having tested the beta version with a user in the matched pair having tested the previous version having a smallest distance between each value associated with each usage feature of each user of the matched pair.

4. The method of claim 2, wherein comparing the average value of the first metric from the previous version with the average value of the first metric from the beta version is computed using a student t test.

5. The method of claim 4, further comprising:
  testing a test statistic from the student t test for the first metric to determine that the beta version is less reliable or more reliable than the release version.

6. The method of claim 5, further comprising:
  forming a confidence interval for each metric from the average values and variances for each metric.

7. The method of claim 6, further comprising:
  using the confidence interval for each metric to output a confidence representing a quality of the matched pair.

8. A system comprising:
  one or more processors; and a memory;
  one or more modules, wherein the one or more modules are configured to be executed by the one or more processors to perform actions comprising:
  receiving beta test data including usage features of each user associated with testing a beta version of a program and previous test data including usage features of each user associated with testing a previous version of the program;
  receiving metric data including metrics associated with the beta version of the program and metrics associated with the previous version of the program; and using at least one machine learning technique to generate an estimation of the performance and/or reliability of the beta version of the program, wherein the one or more machine learning techniques is selected from among:
a first machine learning technique that compares samples of a first metric from a first group of users having tested the previous version of the program with samples of the first metric from a second group of users having tested the beta version of the program, wherein each user in the first group is matched with a user in the second group having a closest similarity of the usage features;
a second machine learning technique that determines if there is sufficient feature coverage of one or more features tested in the beta version compared with the one or more features tested in the previous version; and
a third machine learning technique that performs a cohort analysis to compare samples from metrics of the previous version from at least two time periods to formulate a distribution that is used to identify performance of the previous version for a user that tested the beta version.

9. The system of claim 8, wherein the usage features include a plurality of features associated with a user's testing environment and/or usage of the program.

10. The system of claim 8, wherein the second machine learning technique compares a percentage of users testing one or more features of the previous version and a percentage of users testing the one or more features of the beta version to determine whether the beta test had insufficient coverage of the one or more features.

11. The system of claim 10, wherein a proportion of a percentage test is used to perform the comparison.

12. The system of claim 8, wherein the second machine learning technique determines whether frequency of usage of a feature by the users in the beta version is sufficient.

13. The system of claim 8, wherein the second machine learning technique compares an average frequency of usage of a first feature by the users of the beta version with an average frequency of usage of the first feature by the users of the previous version to determine sufficiency of data for the first feature.

14. The system of claim 13, wherein the second machine learning technique performs a sample mean test to perform the comparison of the average frequency of usage of a feature by the users of the beta version with an average frequency of usage of the feature by the users of the previous version.

15. A device, comprising:
a memory coupled to at least one processor;
wherein the at least one processor is configured to:
receive beta test data including usage features of each user associated with testing a beta version of a program and previous test data including usage features of each user associated with testing a previous version of the program;
receive metric data including metrics associated with the beta version of the program and metrics associated with the previous version of the program; and
utilize at least one machine learning technique to generate an estimation of the performance and/or reliability of the beta version of the program, wherein the one or more machine learning techniques is selected from among:
a first machine learning technique that compares samples of a first metric from a first group of users having tested the previous version of the program with samples of the first metric from a second group of users having tested the beta version of the program, wherein each user in the first group is matched with a user in the second group having a closest similarity of the usage features;
a second machine learning technique that determines if there is sufficient feature coverage of one or more features tested in the beta version compared with the one or more features tested in the previous version; and
a third machine learning technique that performs a cohort analysis to compare samples from metrics of the previous version from at least two time periods to formulate a distribution that is used to identify performance of the previous version for a user that tested the beta version.

16. The device of claim 15, wherein the third machine learning technique performs actions that:
compare differences between metrics from a first time period with metrics from a second time period, wherein the metrics are generated by users who tested the previous version, the first time period and the second time period differ;
formulate a test distribution from the compared differences, the test distribution including a first critical value and a second critical value;
compare, for a single user, metrics from testing the beta version with metrics from testing the previous version, the comparison resulting in a first test statistic; and
estimate the performance of the beta version for the single user based on where the first test statistic fits within the first critical value and the second critical value.

17. The device of claim 16, wherein the single user's performance of the beta version exceeds the single user's performance of the previous version when the first test statistic exceeds a 95% confidence level.

18. The device of claim 17, wherein the single user's performance of the beta version is slower than the single use's performance of the previous version when the first test statistic is less than a 95% confidence level.

19. The device of claim 16, wherein the comparison of differences between metrics from a first time period with metrics from a second time period is performed utilizing a Mann Whitney U test.

20. The device of claim 16, wherein the comparison, for a single user, of the metrics from testing the beta version with metrics from testing the previous version is performed utilizing a Mann Whitney U test.

* * * * *